March 16, 1926.
D. K. HUTCHINSON
TRAILER BUMPER AND GUIDE
Filed Dec. 26, 1922
1,576,975
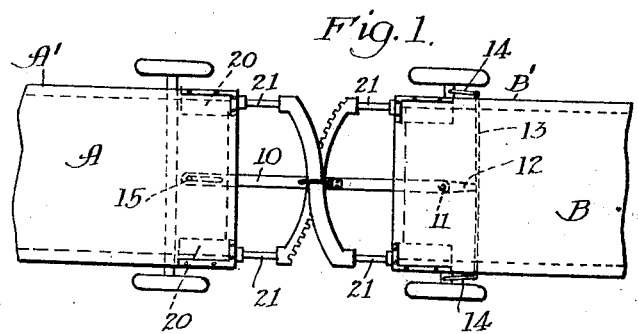
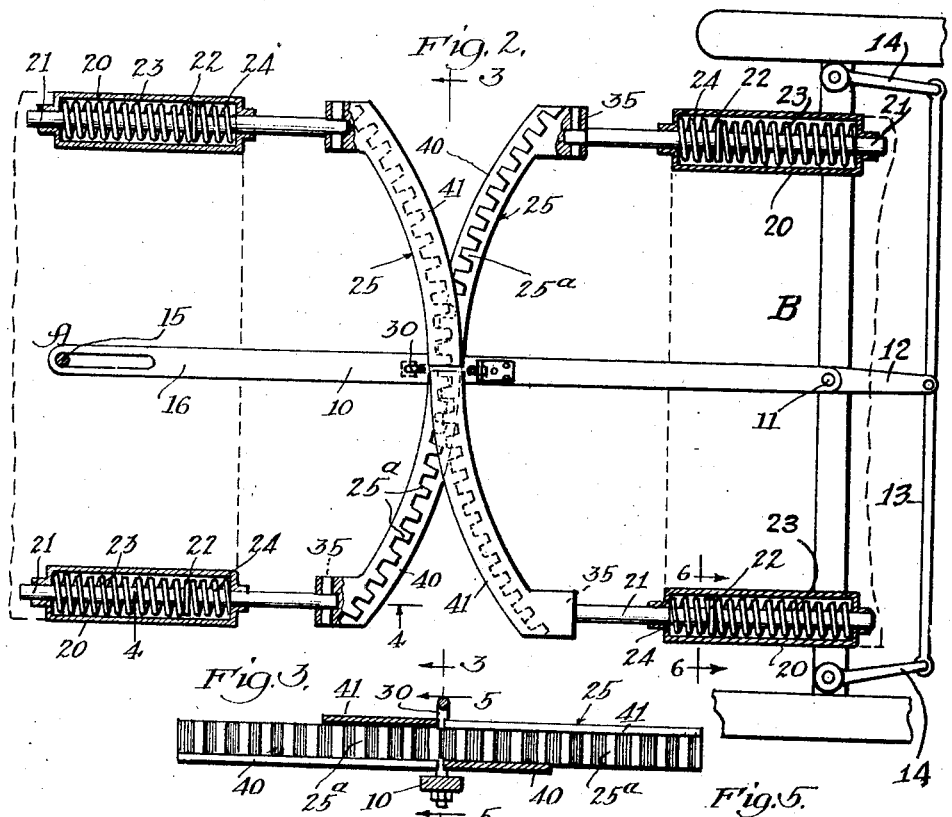
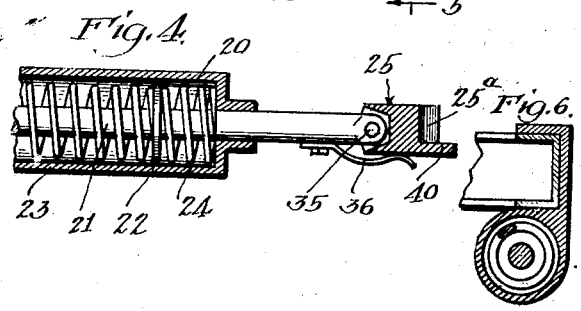
Inventor.
David K. Hutchinson
By James T. Barklew
his Attorney Patented Mar. 16, 1926.

1,576,975

UNITED STATES PATENT OFFICE.

DAVID K. HUTCHINSON, OF LOS ANGELES, CALIFORNIA, ASSIGNOR OF ONE-HALF TO R. C. LIEBMAN, OF LOS ANGELES, CALIFORNIA.

TRAILER BUMPER AND GUIDE.

Application filed December 26, 1922. Serial No. 608,918.

*To all whom it may concern:*

Be it known that I, DAVID K. HUTCHINSON, a citizen of the United States, residing in Los Angeles, county of Los Angeles, State of California, have invented new and useful Improvements in Trailer Bumpers and Guides, of which the following is a specification.

This invention relates to devices for controlling a vehicle that is being towed by another. Generally speaking, the invention is applicable to all sorts of vehicles, including railway vehicles and road vehicles; but, as its most prevalent use is in connection with trailers adapted to be towed by automobiles or automobile trucks, I will explain the invention as thus applied.

One of the great objections to trailers, on the road, has been their tendency to swing from side to side, being thus very dangerous to passing vehicles. This tendency to swing from side to side is especially marked when the towing automobile is slowing down or starting up or is traveling in anything but a straight line. If the towing automobile takes a slight turn to one side or the other on the road, the following trailer has a tendency to swing from side to side; or if for instance, the towing automobile stops, the trailer has a tendency to run ahead on it and has a tendency to run to one side or the other.

I am aware that devices have been perfected for guiding the trailers; but my device combines, in a single apparatus, the functions both of a bumper, or shock absorber, between the trailer and towing vehicle, and the function of a guide. The invention itself will be best understood from the following detailed description of a preferred form of my device, typical of the invention, reference for this purpose being had to the accompanying drawings in which:

Fig. 1 is a plan showing my device applied to automobile truck and trailer;

Fig. 2 is an enlarged sectional plan showing the details of construction of my device;

Fig. 3 is a further enlarged section taken on line 3—3 of Fig. 2;

Fig. 4 is an enlarged detailed section on line 4—4 of Fig. 2;

Fig. 5 is an enlarged detailed section on line 5—5 of Fig. 3; and

Fig. 6 is an enlarged section on line 6—6 of Fig. 2.

In the drawings A may represent the towing vehicle and B the trailer. The details of these two vehicles need not be particulary described. Between the two vehicles a draw bar 10 is arranged, this draw bar usually being pivotally attached to the trailer at a point such as illustrated at 11 and having an extension or other arrangement, such as illustrated at 12, connecting with the link 13 that connects with steering arms 14 of the trailer. The other end of this draw bar is connected to the towing vehicle A; in this particular case I connect it to a pin 15, the draw bar having a slot 16 that will allow the draw bar to move forwardly on the pin and with reference to towing vehicle A.

Mounted at the two rear corners of frame $A^1$ of vehicle A and at the two forward corners of frame $B^1$ of vehicle B there are two pairs of cylinders 20 in which plungers 21 are longitudinally slidable. Each plunger has a collar 22; and behind each collar there is a buffer spring 23, and at the forward side of each collar there is a rebound absorbing spring 24. Mounted on and between the pairs of plungers 21 there are two circular racks 25, the teeth $25^a$ of which mesh with each other as shown in the drawings. The centers of these circular racks may preferably be substantially located at the pivot points 11 and 15, or somewhere near those pivot points. These racks preferably lie just over draw bar 10, so that draw 10 may form a support for them; and in order to keep the racks from being thrown upwardly and out of operative position, the draw bar is provided with a U-bolt 30, that, for convenience of operation when the trailer is being hooked up or unhooked from the truck, is hinged at one side at 31 to draw bar 10 and at the other side is provided with a pin, such as illustrated at 32, that may be quickly withdrawn so that the U-bolt may be raised to release the two racks and so that then, when draft pin 15 is removed from draw bar 10, two vehicles may be readily separated.

In order to provide that the racks shall keep in intermeshing engagement with each other in spite of vertical undulations in the road, I mount each rack, at each end, on the plungers 21 through the medium of horizontal transverse pivot pins 35. This, as will readily be seen, allows the racks to swing around the horizontal axes of these pivot pins, allowing the racks to stay in intermeshing engagement. In order to prevent the racks from falling down out of position when draw bar 10 is removed, small supporting springs 36 are provided on the under side of plungers 21. These springs are merely strong enough to hold up the weight of the racks when the racks are otherwise unsupported; they are not so strong as to interfere with the up and down action of the racks when the vehicles are passing over an undulating road.

In order to keep the racks constantly and properly in mesh with each other they are provided with flanges at their upper and lower edges. Thus each rack has throughout one-half of its length a flange 40 on its lower side, and throughout the other half its length a flange 41 on its upper side. These flanges are so arranged that the upper flange of one rack is at the same end of that rack as is the lower flange of the other rack; and the flanges of the two racks overhang the racks as is best illustrated in Figs. 2, 3, and 5. This interengagement of the flanges holds the racks in proper meshing position at all times. This particular arrangement of flanges need not be necessarily followed, other arrangements may be used; but this particular arrangement has the advantage that the two racks with their flanges are duplicates.

It will be readily seen, without the necessity of further detailed description, how the devices I have described absorb shocks between the truck and trailer; how they absorb any shock on the trailer due to quick slowing down or stopping of the truck. It will also be readily seen how the intermeshing racks keep the trailer always in a position directly behind the truck, regardless of what influences may be brought to bear on the trailer. The fact that the racks are always in mesh, and that they are fixed in transverse relation to the two vehicles, prevents the two vehicles from having any relative sidewise motion. If the truck turns on the road, the draw bar of course swings to an angular position, and the two vehicles assume an angular position with relation to each other. But the two racks stay in mesh, and they therefore still prevent the trailer from having any lateral uncontrolled motion. In fact, the device completely controls the trailer and at all times prevents it having any uncontrolled sidewise motion.

While I have described with some particularity of detail a preferred form of my invention, I do not wish it understood that I have done so for the purpose necessarily of limiting my invention to the specific details herein set forth, but rather that I have given this particular description for the purpose of enabling those skilled in the art to have a full understanding of the invention through having a full and complete understanding of the best embodiment now known of the invention. Accordingly, I do not limit my invention except as specifically so limited in the following claims.

Having described a preferred form of my invention, I claim:

1. A trailer guiding device, adapted to be applied to a towing and trailing vehicle, connected by a draw bar, said device embodying a pair of curved gear racks one mounted on the towing vehicle and the other mounted on the trailer and intermeshing with each other, the draw bar being pivotally connected to both the towing and trailing vehicles substantially at the centers of the gear racks.

2. A trailer guiding device, adapted to be applied to a towing and trailing vehicle, connected by a draw bar, said device embodying a pair of curved gear racks mounted on to the towing vehicle and the other mounted on the trailer and intermeshing with each other; said racks each having upper and lower flanges that overhang the other racks to limit relative vertical movement between the two racks and thus hold the racks in meshing position, the draw bar being pivotally connected to both the towing and trailing vehicles substantially at the centers of the gear racks.

3. In combination with a towing and a trailing vehicle, connected together by a draw bar, a pair of curved racks, one attached to the end of a towing vehicle and the other attached to the forward end of the trailer, said racks intermeshing and lying in proximity to the draw bar, means in connection with the draw bar to limit vertical movement of the racks, and means in connection with the two racks to limit relative vertical movement between them to keep them in intermeshing position.

4. In combination with a towing and a trailing vehicle, connected together by a draw bar, a pair of curved racks, one attached to the end of a towing vehicle and the other attached to the forward end of the trailer, said racks intermeshing and lying in proximity to the draw bar, a releasable U-bolt mounted on the draw bar around the two racks to limit vertical movement of the racks with relation to the draw bar, and flanges at the upper and lower edges of one rack, overlying the other rack, to limit relative vertical movement between the racks and keep them in intermeshing position.

5. A combined trailer bumper and guide, comprising, in combination with a towing and a trailing vehicle connected together by a draw bar, a shock absorbing mechanism mounted on the towing and on the trailing vehicle to receive and absorb stretches in longitudinal directions, a pair of curved intermeshing racks, one mounted on the shock absorbing mechanism of each vehicle, said racks being convex to each other; and means to limit vertical movement of the racks and hold them in intermeshing relation.

6. A combined trailer bumper and guide, comprising, in combination with a towing and a trailing vehicle connected together by a draw bar, a shock absorbing mechanism mounted on the towing and on the trailing vehicle to receive and absorb stretches in longitudinal directions, a pair of curved intermeshing racks, one mounted on the shock absorbing mechanism of each vehicle, said racks being convex to each other; means on one of the racks overlying the other to limit relative vertical movement between the two racks, and means in connection with the draw bar to limit vertical movement of the two racks.

7. A combined trailer bumper and guide, comprising, in combination with a towing and trailing vehicle connected together by a draw bar, a pair of cylinders mounted longitudinally on each vehicle at opposite sides thereof, plungers in the cylinders, springs in the cylinders surrounding the plungers and acting on the plungers to resist their longitudinal movement, a pair of intermeshing racks, each mounted on the plungers of one of the vehicles, the mountings of the racks on the plungers being through the medium of horizontal transverse pivots so that the racks may move about said horizontal tranverse pivot, the racks being convex to each other and being provided with flanges that overly the racks to limit relative vertical movement between the two racks; and means on the draw bar extending around the racks to limit vertical movement of the two racks.

8. A combined trailer bumper and guide, comprising, in combination with a towing and trailing vehicle connected together by a draw bar, a pair of cylinders mounted longitudinally on each vehicle at opposite sides thereof, plungers in the cylinders, springs in the cylinders surrounding the plungers and acting on the plungers to resist their longitudinal movement, a pair of intermeshing racks, each mounted on the plungers of one of the vehicles, the mountings of the racks on the plungers being through the medium of horizontal transverse pivots so that the racks may move about said horizontal transverse pivot, the racks being convex to each other and being provided with flanges that overly the racks to limit relative vertical movement between the two racks; the two racks lying directly over the draw bar and adapted to be supported thereby, a releasable U-bolt mounted on the draw bar and surrounding the two racks; and springs on the ends of the plungers and acting on the racks to support their weight.

9. A trailer guide device, adapted to be applied to a towing and a trailing vehicle, comprising a pair of curved gear racks one mounted on the towing vehicle and the other on the trailing vehicle and in mesh with each other, a draw bar pivotally attached to both the towing and trailing vehicles, said trailing vehicle having steering wheels and steering mechanism, and the draw bar being connected to and operating the steering mechanism of the trailing vehicle.

In witness that I claim the foregoing I have hereunto subscribed my name this 4th day of December, 1922.

DAVID K. HUTCHINSON.